United States Patent [19]

Galbraith

[11] 4,282,429
[45] Aug. 4, 1981

[54] FLASH PROTECTION CONTROLLER

[75] Inventor: Lee K. Galbraith, Mountain View, Calif.

[73] Assignee: The United States of America as represented by the United States Department of Energy, Washington, D.C.

[21] Appl. No.: 101,368

[22] Filed: Dec. 7, 1979

[51] Int. Cl.³ .................. G02F 1/01; H01J 40/14
[52] U.S. Cl. ......................... 250/214 RC; 250/225
[58] Field of Search .............. 250/201, 214 RC, 229, 250/225; 350/150, 359, 374

[56] References Cited

U.S. PATENT DOCUMENTS

| | | | |
|---|---|---|---|
| 3,342,540 | 9/1967 | Abegg et al. | |
| 3,400,270 | 9/1968 | Durig | 250/214 RC X |
| 3,564,261 | 2/1971 | Hadermann et al. | 250/229 X |
| 3,737,211 | 6/1973 | Cutchen et al. | 350/150 X |
| 4,155,122 | 5/1979 | Budmiger | 350/150 X |

Primary Examiner—David C. Nelms
Assistant Examiner—Edward P. Westin
Attorney, Agent, or Firm—George H. Libman; Dudley W. King; Richard G. Besha

[57] ABSTRACT

A controller provides a high voltage to maintain an electro-optic shutter in a transparent condition until a flash of light which would be harmful to personnel is sensed by a phototransistor. The controller then shorts the shutter to ground to minimize light transmission to the user and maintains light transmission at the pre-flash level for a predetermined time to allow the flash to subside. A log converter and differential trigger circuit keep the controller from being triggered by other light flashes which are not dangerous.

7 Claims, 3 Drawing Figures

FLASH PROTECTION CONTROLLER

FIELD OF THE INVENTION

The invention described herein relates generally to an electronic circuit and more particularly to a controller for a thermal/flash protection device. It is a result of a contract with the Department of Energy.

BACKGROUND OF THE INVENTION

In many occupations workers are subject to possible blindness or eye damage as a result of exposure to light flashes of great intensity. For example, military flight crews must maintain their ability to function in an environment of nuclear explosions. For their protection, electro-optic shutters based on the properties of transparent ceramics such as lanthanum-modified lead zirconatetitanate (PLZT) have been developed for flight helmet and aircraft cockpit windows. These shutters are essentially a Kerr cell having a transparent ferroelectric ceramic with electrodes deposited so as to selectively polarize the cell. A fixed polarizing lens is mounted in line with the light source, the cell and the viewer. The fixed lens and the cell are usually arranged such that when an appropriate control voltage is supplied to the cell, the polarizations of the cell and the lens are parallel to enable light to pass through the shutter relatively unhindered. However, when the control voltage is removed from the cell, its polarization rotates 90° and no light will pass through both the fixed lens and the cell. As the voltage to the cell is subsequently increased, the polarization of the cell rotates back to its original orientation, and the amount of light passing through the shutter increases. The instant invention relates to the controller which provides the voltage to control polarization of the cell.

DESCRIPTION OF PRIOR ART

U.S. Pat. No. 3,737,211 discloses a shutter of the type contemplated for use with this invention. This patent also discloses a control circuit sensitive to the amplitude of ambient light for reducing the intensity of light transmitted by the shutter after a flash. The instant invention is a more sophisticated controller which provides additional versatility to an electro-optic shutter as outlined in the objects of the invention set forth below.

OBJECTS OF THE INVENTION

It is an object of this invention to provide a controller which provides a constant DC voltage under ambient light.

It is another object of this invention to provide a controller which is temperature compensated for the effects on the output voltage as a function of temperature.

It is a further object of this invention to provide a controller which switches the control voltage to an "off" condition at the onset of a nuclear flash under all ambient light conditions.

It is still another object of this invention to provide a controller which does not switch the control voltage to an "off" condition under normal changes in ambient light.

It is a still further object of this invention to provide a controller which does not provide a control voltage to allow transparency to be restored after a flash until ambient light has reached a safe level.

It is another object of this invention to provide a controller which keeps the control voltage after a flash to a level such that transmission through the shutter is maintained at a pre-flash level.

Other objects, advantages and novel features of the invention will become apparent to those skilled in the art upon examination of the following detailed description of a preferred embodiment of the invention and the accompanying drawings.

SUMMARY OF THE INVENTION

The invention is a controller for use with an electro-optic shutter. According to the invention, a detecting circuit for generating an electrical signal proportional to the intensity of ambient light is connected to a trigger circuit for providing an output when ambient light is detected to be rising at a rate with respect to time which indicates that a nuclear flash has been detected. A control circuit responds to the output of the trigger to vary the voltage to be applied to a shutter in accordance with the detected light. The control circuit includes a memory to store a signal representative of the pre-flash ambient light so that the post-flash transmission of light can be regulated to the pre-flash level. The control circuit also includes a switch to rapidly disconnect the power to the shutter when a flash is detected. In a preferred embodiment, the trigger circuit may include a log converter circuit and a differentiating circuit.

BRIEF DESCRIPTION OF THE DRAWINGS

The present invention is illustrated in the accompanying drawings wherein.

DETAILED DESCRIPTION OF THE INVENTION

Figure 1:
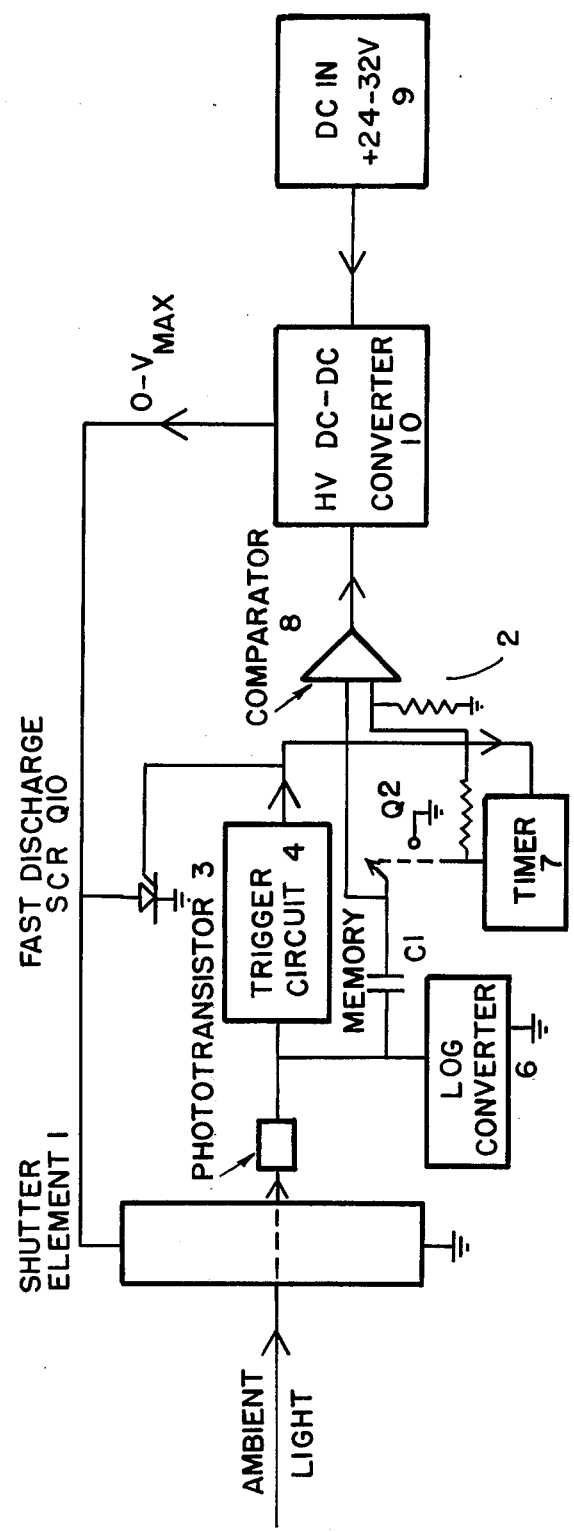
FIG. 1 is a block diagram of the invention.

As shown in FIG. 1, the amount of light transmissible by PLZT shutter 1 is controllable by the controller 2 which is the subject of this invention. This shutter, which may be of the type described in U.S. Pat. No. 3,737,211, has the electrical characteristics of an ideal capacitor of greater than 0.01 uF in parallel with a resistor of greater than $10^9$ ohms. Polarization of the shutter is controlled by a control voltage generated by converter 10 in controller 2. The shutter is closed when the high voltage line is discharged to a reference potential such as ground through switch Q10 of the controller. In accordance with the invention, controller 2 further includes a phototransistor 3 positioned to detect ambient light passing through shutter 1. The output of phototransistor 3 is connected to trigger circuit 4, memory capacitor C1 and log converter 6. Memory capacitor C1 is connected to one input of comparator 8 and through switch Q2 to ground. Switch Q2 is controlled by an output of timer 7; this output is also connected to the other input of comparator 8. The output of trigger circuit 4 controls switch Q10 and timer 7. The output of comparator 8 controls converter 10. Low DC voltage 9 is typically an aircraft power supply which provides power for the controller.

In the circuit of FIG. 1, trigger circuit 4 and log converter 6 function as means for providing a trigger signal based on the rate of rise of intensity of ambient light. Memory capacitor C1, switches Q2 and Q10, timer 7 and comparator 8 function as means for changing the control voltage in response to a trigger signal.

During the pre-flash period, comparator 8 is biased to control high voltage DC—DC converter 10 to generate the maximum voltage in order that shutter 1 will have maximum transparency. A current is generated by phototransistor 3 proportional to the amount of light passing through shutter 1. This current is converted by log converter 6 to a voltage approximating the logarithm of ambient light intensity. The voltage is stored in memory C1. Timer 7 is off, switch Q2 is closed and switch Q10 is open during this period.

When a flash produces a fast rate-of-rise of current from phototransistor 3, trigger circuit 4 momentarily closes switch Q10 thereby shorting the high voltage and darkening the shutter, turns on timer 7, and opens switch Q2. The ungrounded input of comparator 8 has a voltage equal to the difference between the after-flash ambient light passing through the darkened shutter and the pre-flash value stored in memory C1. This error voltage is amplified by comparator 8 to control DC—DC converter 10 to produce an output voltage which keeps the light transmitted through shutter 1 at its pre-flash level while timer 7 is on. If additional flashes take place before the period of timer 7 is over, switch Q10 discharges again and the timer is reset. When the period of timer 7 ends, the circuit reverts to a pre-flash state.

Figure 2:
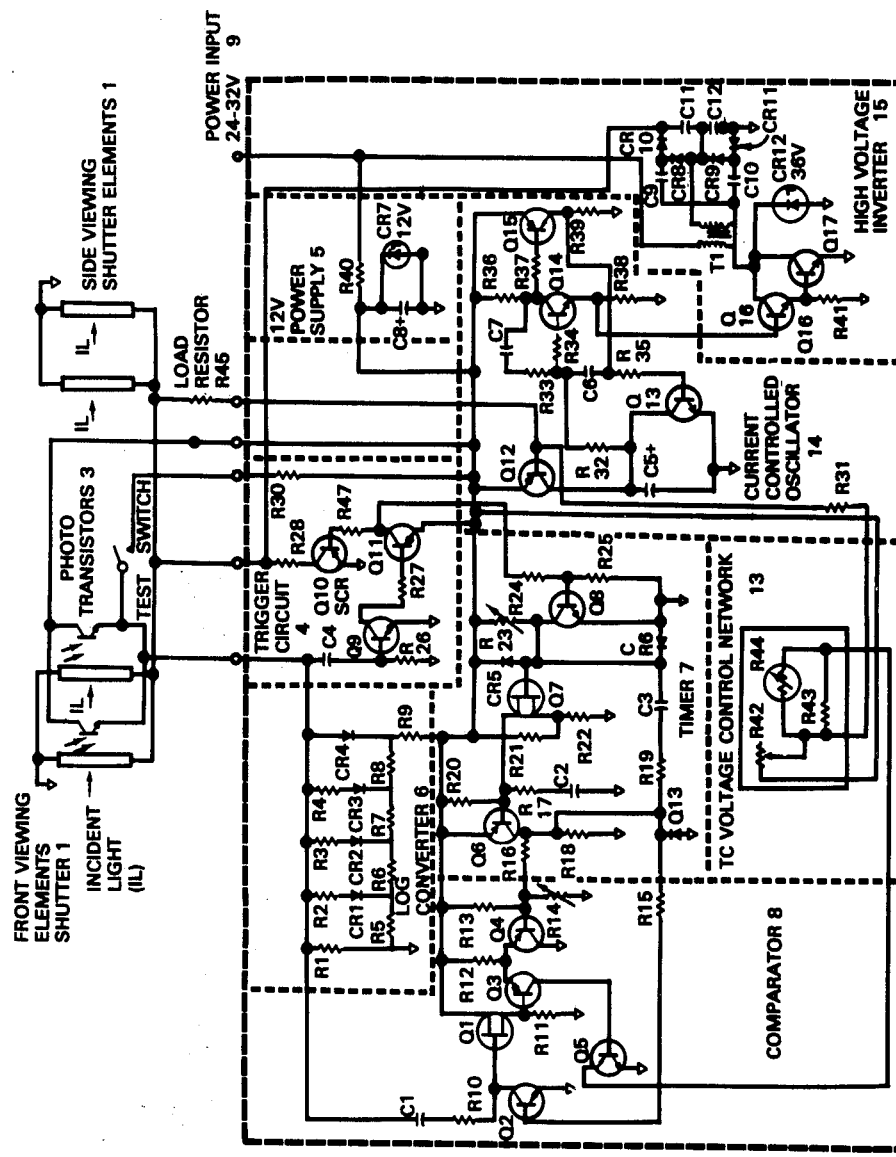
FIG. 2 is a schematic diagram of a preferred embodiment of the invention.

A complete schematic diagram of a preferred embodiment of the controller is shown in FIG. 2. The block elements of FIG. 1 have been outlined in FIG. 2 and numbered with like numbers. The circuit elements of FIG. 2 are identified according to a type designation and type number under the following code: resistor, R; capacitor, C; three element semiconductor, Q; two element semi conductor, CR and transformer, T. A table showing the values of components used in this embodiment is given in an Appendix at the end of this Description of the Invention.

In the embodiment shown in FIG. 2, ambient light passes through a plurality of parallel connected shutters 1 and is sensed by a plurality of parallel connected phototransistors 3. The use of a plurality of these elements provides coverage in more than a single direction. The output of phototransistors 3 is connected to trigger circuit 4 which has a differentiating input comprising C4 and R26 connected as the input of an amplifier consisting of transistor Q9, R27 and transistor Q11. The collector of Q11 is connected through R47 to the control electrode of silicon controlled rectifier switch Q10.

To enable the device to be tested, a test switch and R30 are connected in series between power supply 5 and the input to trigger circuit 4.

The output of phototransistors 3 is additionally connected to the five parallel inputs of log converter 6. R1 connects the first input to ground and CR4 connects the fifth input through R9 to a 12 volt DC power supply 5. R5–R8 form a series chain between ground and the connection of CR4, R9. The series combinations of R2, CR1; R3, CR2; and R4, CR3 are connected between each of the remaining inputs, respectively, and the connections between R5, R6; R6, R7; and R7, R8, respectively.

The output of phototransistors 3 is further connected to one terminal of memory capacitor C1. The other terminal of C1 is connected through R10 to ground through transistor switch Q2.

Switch Q2 is also connected to FET Q1, which is an input for comparator 8. Q1 is connected as a source follower to ground through R11 and to the base of transistor Q3, an input of a differential pair formed with emitter coupled transistor Q4. R12 connects the emitters of C3, Q4 to 12 volt supply 5. The collector of Q4 is grounded while the collector of Q3 is connected to the base of common emitter transistor Q5. R13 and R14 connect the base of Q4 to the 12 volt supply and ground, respectively.

The output of trigger circuit 4 is connected to timer 7 through R24, which with R25 to ground biases transistor Q8 normally off. The collector of Q8 is connected to the 12 volt power supply through R23; to the base of Q2 through series connected C3, R19 and R15; and to ground through reverse biased diode CR6. The interconnection of R19, R15 is connected to ground through reverse biased diode CR13 and R18. The collector of Q8 is also connected to the power supply through clamping diode CR5 and to the gate of FET Q7. One output of Q7 is connected to the base of transistor Q6, power supply 5 through R20 and to ground through series R17 and C2. The other output of Q7 is connected to power supply 5 through R21 and to ground by R22. The emitter of Q6 is connected to power supply 5 and the collector is connected to the interconnection of R19, R15 and, through R16, to the base of Q4 in comparator 8.

The output of Q5 in comparator 8 is connected to one end of the parallel combination of thermistor R44 and R43 in temperature compensating voltage control network 13. The other end is connected to the center tap of potentiometer R42 and through R31 to the base of transistor Q12 at the input of current controlled oscillator 14. A fixed contact of R42 is connected to low voltage power supply 5.

Q12 acts as a current source between the 12 volt power supply and C5 to ground. C5 is also connected to the collector of transistor Q13 and through R32, C6 and R35 to the base of grounded emitter Q13. The junction of R32, C6 is also connected to the collector of transistor Q14 through R33 and C7 and to the base of Q14 through R34. The collector of Q14 is further connected to the low voltage power supply through R36 and to the base of transistor Q15 through R37. The emitter of Q15 is connected to the low voltage supply and the collector is connected to ground through R39 and to the connection between C6, R35. The emitter of Q14 is grounded through R38 and forms the output of oscillator 14 through a connection to the base of transistor Q16 in high voltage inverter 15.

Transistors Q16 and Q17 form a Darlington pair at the input of inverter 15 with R31 grounding the emitter of Q16 and the emitter of Q17 being grounded. The collectors are clamped to ground through 36 volt zener diode CR12 and are connected through the primary of transformer T1 to the unregulated low voltage power supply 9. The secondary of T1 is connected to a rectifying voltage doubler comprising C9 through C12 and diodes CR8 through CR11. The high voltage output is connected to the shutters 1, through R28 to switch Q10, and through R45 to the base of Q12.

The unregulated 24 to 32 volt power input 9 is connected to power supply 5 which includes input R40 to the output and parallel C8 and zener diode CR7 to ground.

Having outlined the construction of a preferred embodiment of this invention, the operation of the circuit is set forth below.

Zener diode CR7 is designed to provide at least 5 ma at a 12 volt regulated output; C8 supplies extra current when pulses in the circuit momentarily draw more than 5 ma from the 12 volt line.

In pre-flash operation, a high voltage is supplied to shutter 1 by means for providing a control voltage which include high voltage inverter 15 under the control of current controlled oscillator 14. The oscillator has a direct coupled, positive gain amplifier Q14, Q15 with positive AC feedback through C6. When Q15 conducts, the 12 volts at its collector is applied through C6 and R34 to turn on Q14. When C6 discharges, Q14 and Q15 switch off. C7 applies a momentary source of 1-12 volts to R33 so that C6 will decay towards the negative voltage and reach the turn off voltage for Q14 before the circuit becomes too temperature dependent on the characteristics of C6. Oscillation is provided because Q12 charges C5 until the Q14 turn on voltage is reached. When the one-shot amplifier fires, Q13 discharges C5 to renew the cycle. Accordingly, the output of the oscillator 14 is a train of fixed-length pulses at a repetition rate proportional to the current supplied by Q12.

The output of oscillator 14 is amplified by Darlington pair Q16, Q17 of high voltage inverter 15 to the 24 to 32 volt level of incoming voltage and applied to the primary of T1. Since the narrow 5 microsecond pulse width prevents saturation of T1, the output is more than 700 volts. This output is doubled and rectified to yield a high voltage that is a function of pulse repetition rate and the impedance of R45.

The current through control transistor Q12 of oscillator 14 is a function of the difference between a feedback signal of the high voltage through R45 and a signal from the temperature compensation network 13. The output of Q12 is maximized when the output of network 13 is minimized, which occurs when Q5, at the output of comparator 8, is saturated.

During pre-flash operation, Q5 is controlled by timer 7, as the gate of Q7 is held near 12 volts and Q8 is held in a non-conducting state, keeping Q6 and switch Q2 saturated to unbalance comparator 8 and keeping C3 discharged to prevent the initiation of the timing sequence.

Comparator 8 is initially set so that the collector of Q5 is at 6 volts when the gate of Q1 is grounded. This active trim is accomplished by shorting R20 to turn off Q6, grounding the gate of Q1 and trimming R14 until the desired voltage is measured.

In the unbalanced pre-flash stage, Q4 of comparator 8 is held off by the voltage from Q6 and Q3 is held on by Q1. The current through Q3 keeps Q5 saturated to maximize the voltage to the shutter as outlined above.

Log converter 6 is a current dependent impedance which has a voltage drop obeying a five-segment straight-line approximation to a logarithmic curve as a function of the current from phototransistors 3. Diodes CR1-CR4 are reverse biased by 0.6, 1.8, 3, and 4 volts respectively. The 0.6 volt drop across each of these silicon diodes establish the network conduction points at 1.2, 2.4, 3.6 and 4.6 volts. At photocurrents of zero to 0.12 microamperes, the network impednace is R1 or 10 Megohms. As the current increases, the diodes go into conduction sequentially and the network impedance drops by a factor of 1.2 volts per decade. The sensitivity of the phototransistors 3 is set to deliver a current of 1 milliamp at full sunlight illumination; the network output voltage being about 7 volts at that level.

Log converter 6 serves to convert the extremely large range of ambient light signal to a useful swing for application to memory C1 and trigger circuit 4. This voltage approximates the visual stimulus of ambient light to the eye more closely than a linear response. In the alternative, a logarithmic response could be obtained by using a single diode or by using a photovoltaic detector instead of a phototransistor, but in both of these cases the maximum voltage at full sunlight would be only 0.6 volt. Operation at such low levels would multiply the effects of drift and offset voltage in the comparator circuit, and amplification to the 6 volt level would require the additional complications of a low-drift integrated circuit operational amplifier.

During pre-flash operation, the logarithmic voltage output of phototransistors 3 as modified by log converter 6 is stored in memory capacitor C1, the other end of this capacitor being grounded by saturated Q2.

Whether trigger circuit 4 provides an output or not depends on the rate of change of the amplitude of ambient light as a function of time. When current from phototransistors 3 increases at a sufficient rate, Q9 and Q11 conduct causing switch 11 to conduct and turning on timer 7. The operation of trigger circuit 4 is dependent on the rate-of-rise of the detected light as determined by the voltage drop across differentiating circuit R26, C4 exceeding the 0.6 volt turn on level of Q9. The time constant of this circuit is set at approximately 1 millisecond.

One of the advantages of this invention is that the amplitude of the light step required to trigger the circuit depends on the steady-state ambient light level before the flash. Because the impedance of log converter 6 across differentiating circuit R26, C4 is a function of the pre-flash current from phototransistor 3, the amplitude of the light flash required to turn on trigger circuit 4 is dependent on the ambient light level before the flash. The following example will illustrate this advantage.

At very low light levels the current from phototransistors 3 is insufficient to cause any of diodes CR1-CR4 to conduct; accordingly, the input impedance of trigger circuit 4 is essentially the value of R26, 100K. Since Q9 will turn on with a base-emitter voltage greater than 0.6 volt, a current of 0.6/100K or 6 $\mu$A is necessary to trigger the circuit. If phototransistor 3 requires 10K footcandles of illumination (sunlight) for 1 ma of current output, then the instantaneous rise in light level caused by a flash necessary to trigger the circuit at low light levels is 10K footcandles/ma $\times$ 0.006 ma = 60 footcandles.

At full sunlight, however, the 1 ma current from phototransistors 3 will cause all diodes in log converter 6 to conduct, yielding an impedance of 2.63 Kohms at the input of trigger circuit 4. Under this condition a current of 0.6/2.63K or 228 ua, or an instantaneous flash of 10K $\times$ 0.228 = 2280 footcandles, is required to turn on trigger circuit 4.

If the initial flash waveform is not the ideal step function assumed for the examples given above, the trigger sensitivity will be less than the calculated values. However, trigger sensitivity is not degraded significantly unless the rise time of the flash is greater than 0.5 milliseconds. This feature allows the shutter to close for a nuclear blast but remain open for safe sources such as aircraft lights. The circuit may be tested by operation of the test switch to put a 12 volt step on the input of trigger circuit 4.

Timer 7 is essentially a retriggerable one-shot multivibrator with a timing period determined by R23, C3. When a trigger pulse turns on Q8, Q7 and Q6 are turned off. The collector of Q6 thus falls to ground potential, turning off Q2. C3 now begins to charge through R23. When the voltage across C3 reaches the 8 volt source-gate pinch off voltage of Q7, Q7 and Q6 both turn back on. C3 is discharged through CR5 and the timer is back in a quiescent state. Should an additional flash cause another trigger pulse to occur while the timer is on, C3 is discharged through CR13, R19 and Q8 and the timing cycle begins again.

For protection from the extended effects of a nuclear flash, the timer period has been set at a nominal value of 20 seconds in this embodiment.

When Q2 and Q6 are turned off by operation of timer 7, comparator 8 functions as a linear voltage amplifier with an extremely high input impedance to amplify the voltage difference between the instantaneous, after-flash, log converter voltage and the pre-flash voltage stored in memory C1. The amplified output through Q5 controls the current controlled oscillator to keep the after-flash light transmission of the shutter at its pre-flash level for the duration of timer 7 operation.

Several problems arise if the controller described above is connected directly to an aircraft power line. Since controller 2 draws pulse currents up to 1 ampere for 5 microseconds, a considerable amount of high-frequency interference can be injected into power line 9. Also, the output of 9 is subject to short-term voltage fluctuations of up to 80 volts and spikes of up to ±600 volts under some conditions. These fluctuations could damage controller 2 or trigger shutter 1 in the same manner as a light flash. Finally, if a large shutter area puts a large capacitive load on the high voltage output of the controller, the initial turn on current could exceed the power dissipation capability of Q17.

Figure 3:
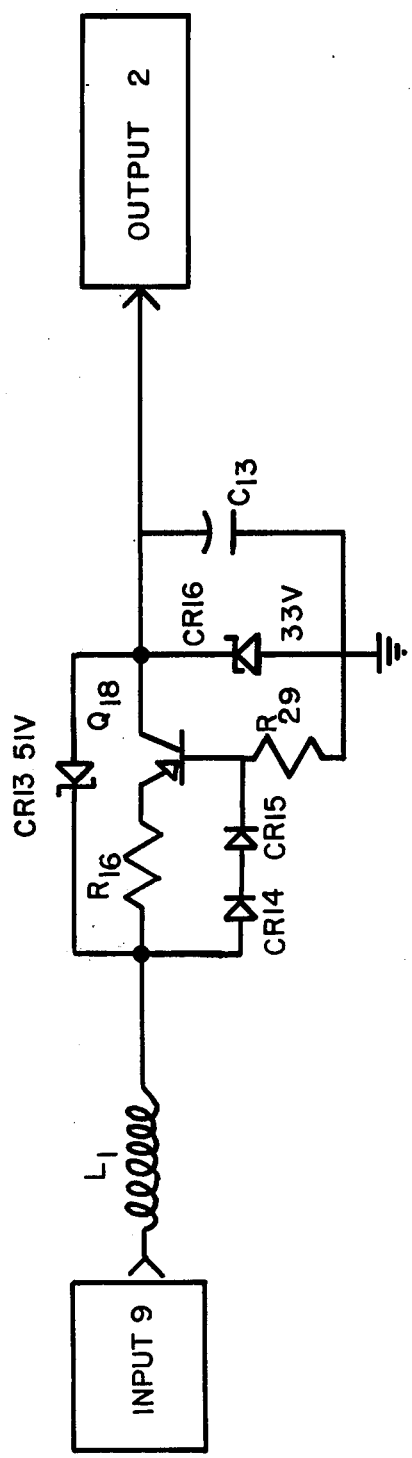
FIG. 3 is a schematic diagram of a power conditioner for coupling the invention to an aircraft power supply.

The power conditioner shown in FIG. 3 solves the aforementioned difficulties when it is inserted between supply 9 and controller 2. The conditioner is basically a low-pass LC filter with a voltage and current limiting network placed between L1 and C13. C13 acts at a low-impedance source for the high pulse current required by controller 2. At average collector currents below the limiting current, Q18 is saturated by base current flowing through R29 to ground. The current limiter then appears as a 10 ohm resistor in series with L1 between the controller input and power line 9. When the controller draws an average current of 60 to 70 ma, the voltage drop across R46 plus the base-emitter drop across Q18 exceeds the drop across the CR14, CR15 diode string sufficiently to bring Q18 out of saturation. The collector current will not exceed 60 to 70 ma regardless of the voltage across the controller input down to zero volts.

This current-limiting circuit also protects Q17 from excessive dissipation when a large capacitive shutter load is energized. And zener diode CR16 protects the controller input from large DC input excursions. L1 protects the controller from high voltage spikes from supply 12 and zener diode CR13 clips spikes which get through the inductor to a level which can be withstood by Q18.

The values of the components indicated in this disclosure are listed in the Appendix.

What has been disclosed is a controller for an electro-optic shutter which provides a constant DC voltage under ambient light conditions as a result of the saturation of Q5 and a constant voltage under variable temperature conditions as a result of the operation of temperature compensating network 13. Switch Q10 reduces the control voltage to zero at the onset of a detected flash, and the controller maintains the voltage at a reduced level until the level of light transmitted to the detector has reached an acceptable level. The differential input to trigger circuit 4 with other circuitry ensures that the control voltage does not reduce to zero under conditions other than those which pose a real danger to personnel using the invention. Memory capacitor C1 and other circuitry maintain the control voltage after a flash to a level which ensures that personnel using the invention can see, but not be blinded.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended thereto.

APPENDIX

| CAPACITORS (µf) | | RESISTORS (ohms) | | | | | |
|---|---|---|---|---|---|---|---|
| C1 | .1 | R1 | 10M | R16 | 100K | R31 | 150K |
| C2 | .1 | R2 | 1M | R17 | 100K | R32 | 10K |
| C3 | 1.0 | R3 | 100K | R18 | 10K | R33 | 10K |
| C4 | .01 | R4 | 10K | R19 | 100 | R34 | 10K |
| C5 | .1 | R5 | 600 | R20 | 20K | R35 | 10K |
| C6 | .001 | R6 | 1.2K | R21 | 50K | R36 | 10K |
| C7 | .1 | R7 | 1.2K | R22 | 100K | R37 | 100K |
| C8 | 1.0 | R8 | 1K | R23 | 40M | R38 | 2K |
| C9 | .01 | R9 | 8K | R24 | 27K | R39 | 10K |
| C10 | .01 | R10 | 1M | R25 | 3K | R40 | 2.4K |
| C11 | .01 | R11 | 10K | R26 | 100K | R41 | 1K |
| C12 | .01 | R12 | 80K | R27 | 10K | R42 | 50K |
| C13 | 10.0 | R13 | 100K | R28 | 100 | R43 | 2.37K |
| | | R14 | 20K | R29 | 10K | R44 | 5K |
| | | R15 | 200K | R30 | 1K | R45 | 20M |
| | | | | | | R46 | 10 |
| | | | | | | R47 | 2K |

All NPN transistors are B2T2222C and all PNP transistors are B2T2907C except Q1 and Q7 are B2T4857C; Q17 is B2T3725C and Q18 is 2N4919.

All diodes are B20914C except CR7 is B27759C and CR13, CR14 are 1N914.

I claim:

1. A controller for use with a flash protection device having an electro-optic shutter wherein the amount of light transmitted by the shutter is controlled by the magnitude of DC voltage, said controller comprising: a detecting means for generating an electrical signal proportional to the intensity of ambient light; trigger means, connected to said detecting means, for providing a trigger signal based on the rate of rise of intensity of ambient light; a low voltage power supply; control means, connected to said power supply, for providing a control voltage for the shutter; switch means for connecting the control voltage to a point of reference potential in response to the trigger signal; memory means responsive to the trigger signal for storing a voltage indicative of pre-flash ambient light; and amplifier means for connecting the output of said memory means to said control means in response to said trigger signal.

2. The controller of claim 1 further comprising: timer means for providing a continuous output for a predetermined period of time in response to said trigger signal, the output of said timer being connected to said amplifier means.

3. The controller of claim 1 wherein said control means comprises: oscillator means for generating a series of pulses and high voltage inverter means for converting the pulses to the DC control voltage.

4. The controller of claim 1 wherein said control means comprises: a thermistor connected between said low voltage power supply and said amplifier means; a souce means for generating a direct current proportional to the difference in the voltage at said thermistor and said control voltage; oscillator means connected to said source for generating a series of pulses having a repetition rate proportional to the direct current; and high voltage inverter means for converting the pulses to the DC control voltage.

5. A controller for use with a flash protection device having an electro-optic shutter wherein the amount of light transmitted by the shutter is controlled by the magnitude of DC voltage, said controller comprising: a detecting means for generating an electrical signal proportional to the intensity of ambient light; log converter means, connected to said detecting means, for providing a voltage proportional to the logarithm of ambient light; differentiating means, connected to said log converter means, for detecting the change in the voltage as a function of time, thereby providing a trigger signal based on the rate of rise of intensity of ambient light; a low-voltage power supply; control means, connected to said power supply, for providing a control voltage for the shutter; and means for changing the control voltage in response to the trigger signal.

6. The controller of claim 5 wherein said log converter means comprises: means for varying the impedance between the output of said detecting means and a point of reference potential as a function of the logarithm of the current of the electrical signal.

7. The controller of claim 6 wherein said log converter means comprises: a resistive divider chain consisting of a series of resistors connected between said low voltage power supply and said point of reference potential; one terminal of a reverse biased diode connected to each node between two resistors in said chain, the other terminal of the diode connected to the node closest to the power supply being connected to said detecting means; a series resistor connected between the other terminal of each remaining diode and said detecting means.

* * * * *